United States Patent [19]

Kawamura et al.

[11] Patent Number: 4,763,208
[45] Date of Patent: Aug. 9, 1988

[54] PLAYBACK APPARATUS IN ELECTRONIC STILL CAMERA SYSTEM

[75] Inventors: Koichiro Kawamura, Shonanmachi; Tadashi Ohta, Tokyo, both of Japan

[73] Assignee: Nippon Kogaku K. K., Tokyo, Japan

[21] Appl. No.: 795,185

[22] Filed: Nov. 5, 1985

[30] Foreign Application Priority Data

Nov. 13, 1984 [JP] Japan .................................. 59-239013

[51] Int. Cl.⁴ ........................ H04N 5/78; G11B 27/02
[52] U.S. Cl. .................... 360/33.1; 360/10.1; 360/14.1; 358/335; 358/312
[58] Field of Search ............. 360/10.1, 14.1, 33.1, 360/9.1; 358/312, 335, 342, 93, 102, 183, 909; 364/521; 340/750

[56] References Cited

U.S. PATENT DOCUMENTS

| | | | |
|---|---|---|---|
| 3,849,596 | 11/1974 | Lawrence | 358/93 |
| 3,953,666 | 4/1976 | Justice et al. | 358/146 X |
| 4,360,876 | 11/1982 | Girault et al. | 364/449 |
| 4,361,849 | 11/1982 | Bolgen | 360/10.1 |
| 4,400,727 | 8/1983 | Aron | 358/102 X |
| 4,430,675 | 2/1984 | Fujime | 360/10.1 X |
| 4,554,597 | 11/1985 | Sugiyama et al. | 358/342 X |
| 4,614,979 | 9/1986 | Sugiyama et al. | 360/10.1 X |

FOREIGN PATENT DOCUMENTS 2542502 4/1977 Fed. Rep. of Germany ...... 358/183

Primary Examiner—Aristotelis M. Psitos
Attorney, Agent, or Firm—Shapiro and Shapiro

[57] ABSTRACT

A playback apparatus in an electronic still camera system is so structured that digital processing is applied to regenerated image signals and plural pictures are simultaneously displayed on a monitor screen. With this construction, the contents of record on a magnetic disk can be searched within a short time.

11 Claims, 5 Drawing Sheets

FIG. 2

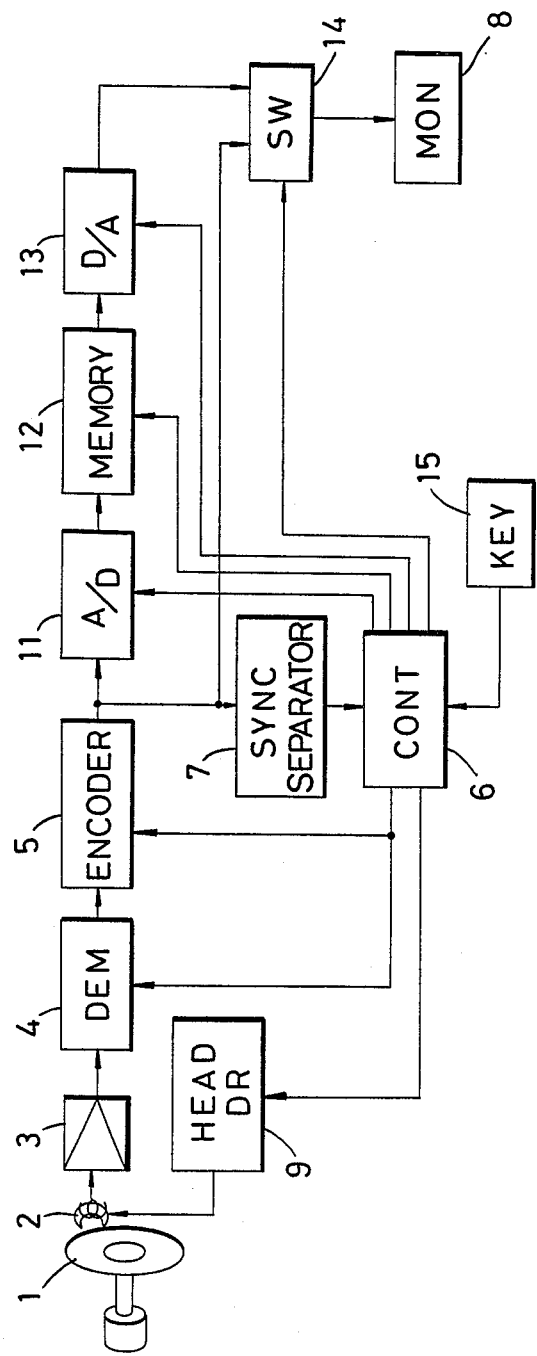
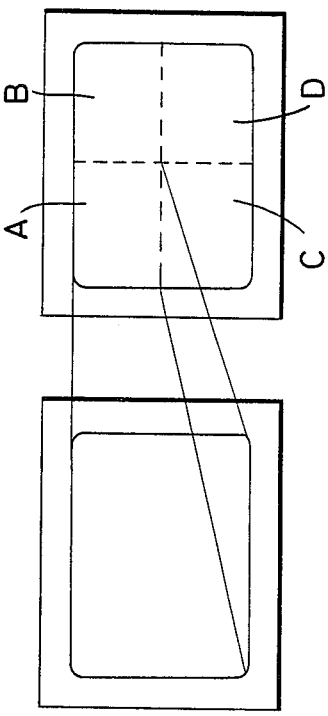

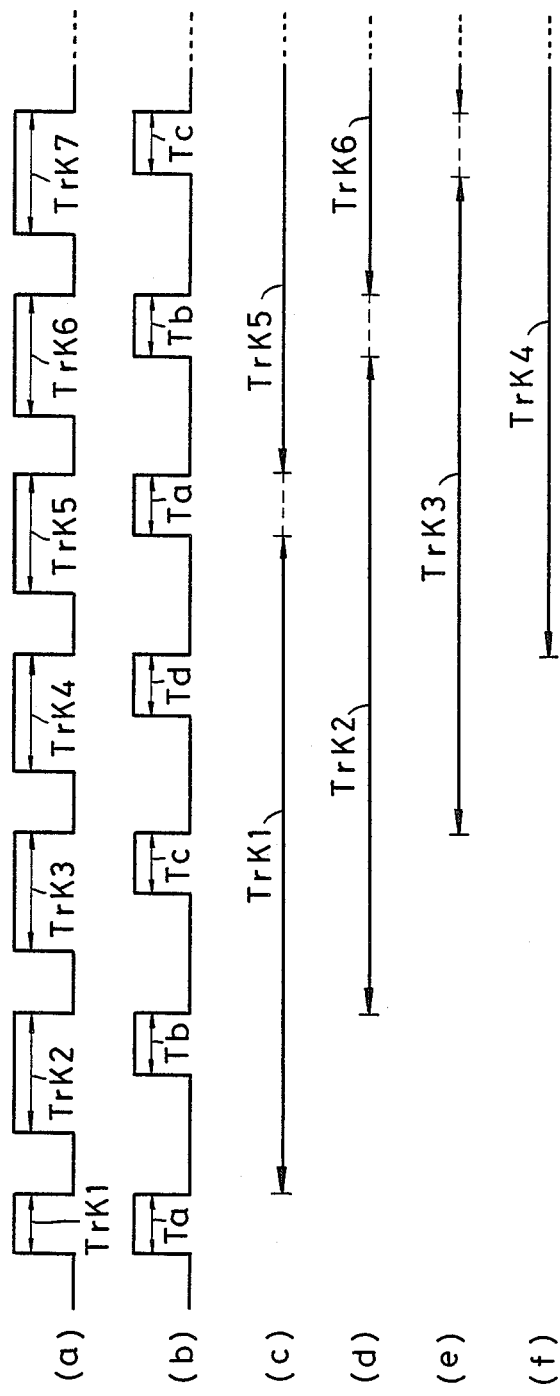

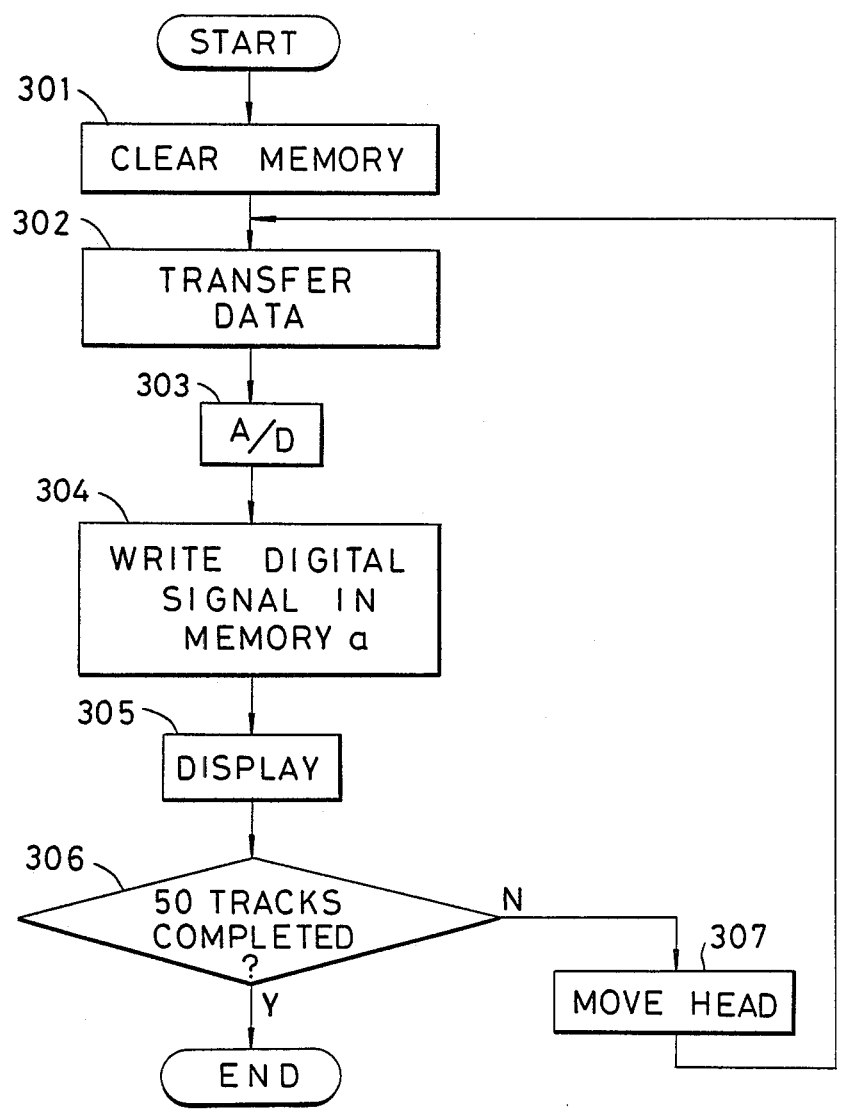

PLAYBACK APPARATUS IN ELECTRONIC STILL CAMERA SYSTEM

BACKGROUND OF THE INVENTION

1. Field of the Invention

The present invention relates to a playback apparatus for use in an electronic still camera system which records image signals of a still picture of one field or one frame on a magnetic disk and regenerates said image signals.

2. Description of the Prior Art

In an electronic camera system for recording image signals of a still picture on a magnetic disk with an electronic still camera, as disclosed for example in the U.S. Pat. No. 4,366,501, there is proposed a format of recording plural pictures in a magnetic disk, i.e., 50 pictures for field signals or 25 pictures for frame signals.

In a playback apparatus for such electronic still camera system, the user may want to search and confirm rapidly the contents of the record on the magnetic disk. In such case, successive displays of pictures on a monitor screen require an excessively long time. In the electronic still camera system, it will be often required to search several magnetic disks, and the above-mentioned method will require an intolerably long time.

SUMMARY OF THE INVENTION

In consideration of the foregoing, the object of the present invention is to provide a playback apparatus, for use in an electronic still camera system, allowing the operator to search the content of record on a magnetic disk within a short time.

The above-mentioned object can be achieved, according to the present invention, by applying digital processing to the regenerated image signals and displaying plural pictures simultaneously on a monitor screen.

BRIEF DESCRIPTION OF THE DRAWINGS

FIG. 1 is a block diagram showing an embodiment of a signal processing system for use in the playback apparatus of the electronic camera system of the present invention;

FIG. 2 is a schematic view showing the relationship of pixels in a reduced display;

FIG. 3 consisting of (a)-(f) is a timing chart of a search function in a special playback mode in a first embodiment of the present invention;

FIG. 6 is a flow chart showing a search function in a special playback mode in a third embodiment.

DETAILED DESCRIPTION OF THE PREFERRED EMBODIMENTS

Figure 4:
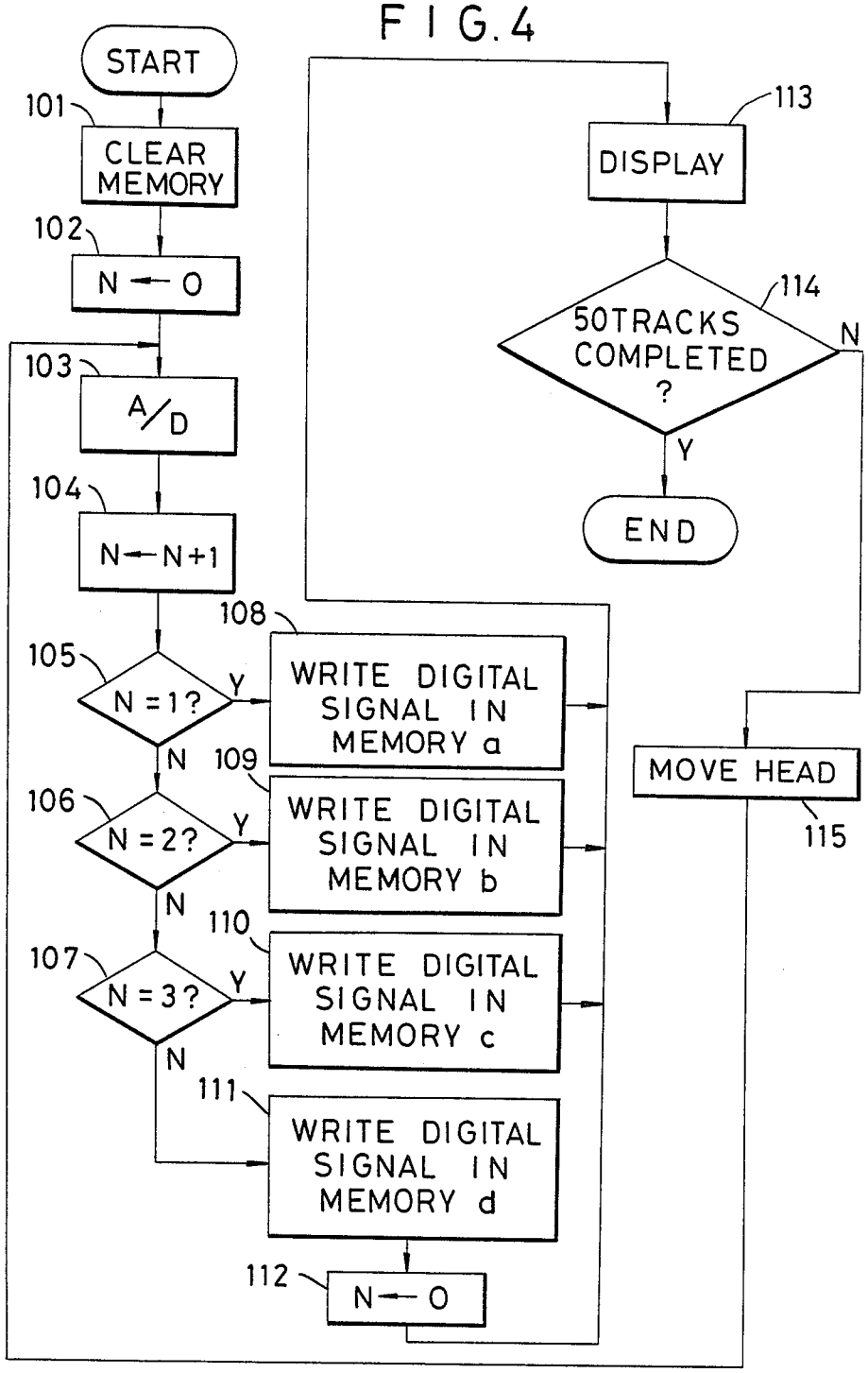
FIG. 4 is a flow chart showing the function of the first embodiment.

FIG. 1 is a block diagram of an embodiment of a signal processing system of the playback apparatus according to the present invention.

The playback apparatus of the present invention is capable, in addition to a normal playback mode in which the regenerated video signal is displayed on a monitor screen, of a special playback mode in which the regenerated video signal is subjected to digital processing for displaying plural pictures simultaneously on divided areas of the monitor screen.

If a cathode ray tube is used as the monitor, the screen is preferably divided into 1, 4, 9 or 16 areas in order to maintain a constant vertical-to-horizontal ratio. For example, if the screen is divided into four areas, a video signal corresponding to a quarter of the original picture can be obtained by storing every other pixel in the horizontal scanning lines of odd numbers as shown in FIG. 2. In FIG. 2, A, B, C and D respectively indicate picture areas of a screen divided into four areas. Now referring to FIG. 1, an image signal of a still picture recorded on each track of a magnetic disk 1 is regenerated by a playback head 2 and amplified in an amplifier 3. The obtained regenerated signal is demodulated in a demodulator 4, including a de-emphasis circuit etc., into a luminance signal and color difference signals, which are then converted in an encoder 5 into a video signal. A synchronization signal separator 7 extracts synchronization signals from said video signal, and the separated synchronization signals are supplied to a control circuit 6 which controls the entire signal processing for example by generating head drive pulses etc.

The video signal obtained in this manner is displayed and viewed on a monitor 8. There are further provided a head drive unit 9, an analog-to-digital (A/D) converter 11, a memory 12, a digital-to-analog (D/A) converter 13, and a switch 14. In the special playback mode, the video signal is converted, by means of the A/D converter 11, into a digital signal which is stored in the memory 12. On the other hand, in the normal playback mode, the video signal from the encoder 5 is directly supplied to the monitor 8 through the switch 14. A key 15 will be explained in relation to a second embodiment of the present invention.

In the above-mentioned special playback mode, wherein the video signal of a field is reduced to half both in the vertical and horizontal directions, the A/D converter 11 performs signal sampling in the horizontal direction at a determined synchronization speed in response to the drive pulses from the control circuit 6, and the A/D conversion in the horizontal direction is conducted in every other line. The memory 12 is required to have a capacity of storing signals of a field, and stores four pictures by storing each picture with a quarter of said capacity.

The control circuit 6 divides the synchronization signal from the synchronization separator 7 to supply a signal of doubled period to the A/D converter 11, which, in response to said signal of doubled period, effects A/D conversion on every other horizontal scanning line. If the electronic still camera generates a video signal of a field in an exposure, said video signal is recorded on a track of the magnetic disk 1. On the other hand, if the electronic still camera generates a video signal of a frame in an exposure, there are used either one or two tracks of the magnetic disk, in order to record the video signal of a field each.

Memory areas a, b, c and d of a capacity of a quarter field each in the memory 12 respectively correspond to the divided picture areas A, B, C and D of the monitor and store the image signals of said picture areas. The digital signals of four pictures are read from the memory 12 by means of the control circuit, then converted to video signals in the D/A converter 13, added with the synchronization signals from the control circuit 6 and displayed on the monitor screen through the switch 14 for selecting the normal playback mode or the special playback mode.

Now reference is made to FIGS. 3 and 4 for explaining the operation for a case of rapidly searching the content of a magnetic disk bearing the records of field signals, in the special playback mode.

Referring to FIG. 4, a first step 101 clears the memory 12, and a step 102 resets the content N of an internal counter of the control circuit 6. This step prevents random signals stored in the memory 12 from being displayed on the monitor 8 as unpleasant noise.

Then the playback head 2 reads the track 1 of the magnetic disk 1, and a step 103 effects the A/D conversion of the regenerated video signal.

Subsequently a step 104 effects a stepwise increment of the content N of said internal counter, and a step 105 identifies if N is equal to 1. If so, a step 108 stores the signal, obtained from the A/D converter 11, into the memory a. In a step 113, the content of the memory 12 is subjected to D/A conversion and is displayed on the monitor 8. In this state the monitor displays the content of said memory area a alone, since the memory areas b, c and d do not store the signals from the disk 1. A succeeding step 114 identifies whether the playbacks of 50 tracks have been completed, and, if not, a step 115 shifts the head 2 to a succeeding track, which is track 2 in this case.

Then the program proceeds through the steps 103 and 104 as explained before and reaches the step 105. Since N=2 in this state, the program proceeds through a step 106 to a step 109, in which the digital signal obtained from the A/D converter 11 is stored in the memory area b. Then the step 113 displays the contents of the memory areas a and b. Subsequently the program proceeds through the step 114 to the step 115 in which the head is shifted to a track 3.

Then the control circuit 6 executes the program again through the steps 103, 104, 105 and 106. Since N=3 in this state, the program proceeds through a step 107 to a step 110 in which the digital signal obtained from the A/D converter 11 is stored in the memory area c. The step 113 then displays the contents of the memory areas a, b and c. Subsequently the program proceeds through the step 114 to the step 115 in which the head is shifted to a track 4.

Again the control circuit 6 executes the program through the steps 103, 104 105, 106 and 107. Since N=4 in this state, the program proceeds to a step 111 in which the digital signal obtained from the A/D converter is stored in the memory area d. A succeeding step 112 resets the internal counter N, and the step 113 displays the contents of the memory areas a, b, c and d. Subsequently the program proceeds through the step 114 to the step 115, in which the head 2 is shifted to a track 5. The above-explained procedure is repeated until the step 114 identifies the completion of playback of the 50th track, when the function of the apparatus is terminated.

In FIG. 3, a curve (a) indicates the position of the head 2, which is positioned at respectively different tracks as indicated by Trk1, Trk2, ... , Trk7. A curve (b) indicates the periods of signal storage into the memory 12, wherein the periods Ta, Tb, Tc and Td respectively correspond to the signal storages into the memory areas a, b, c and d. In a curve (c), a solid line portion indicates the period of display of the signal stored in the memory area a on the monitor 8. Similarly the curves (d), (e) and (f) indicate the periods of display of the signals stored in the memory areas b, c and d, and the displayed tracks are indicated for example by Trk1, Trk2 etc.

In this manner the regenerated video signals are displayed in succession from the track 1 to the track 50. This search method requires only a quarter of the time in comparison with the conventional search method, if the period of display for each track remains same. Also said period of display can be modified by varying the waiting time from the shift of the head 2 to a certain track to the playback of said track. Also the display of the digital video signals on the monitor can be realized in various manners, for example by allotting the divided areas A, B, C and D of the monitor 8 respectively to the memory areas a, b, c and d of the memory 12 as explained above; or displaying the latest signal from said memory areas a, b, c, or d always on the area A of the monitor 8, the second latest signal always on the area B of the monitor 8 and the earliest signal always on the area D of the monitor B so that the picture displayed on said area D is erased from the display when a new picture is displayed; or changing plural displayed pictures at the same time; and storing a desired picture in one of the areas A to D of the monitor 8.

Figure 5:
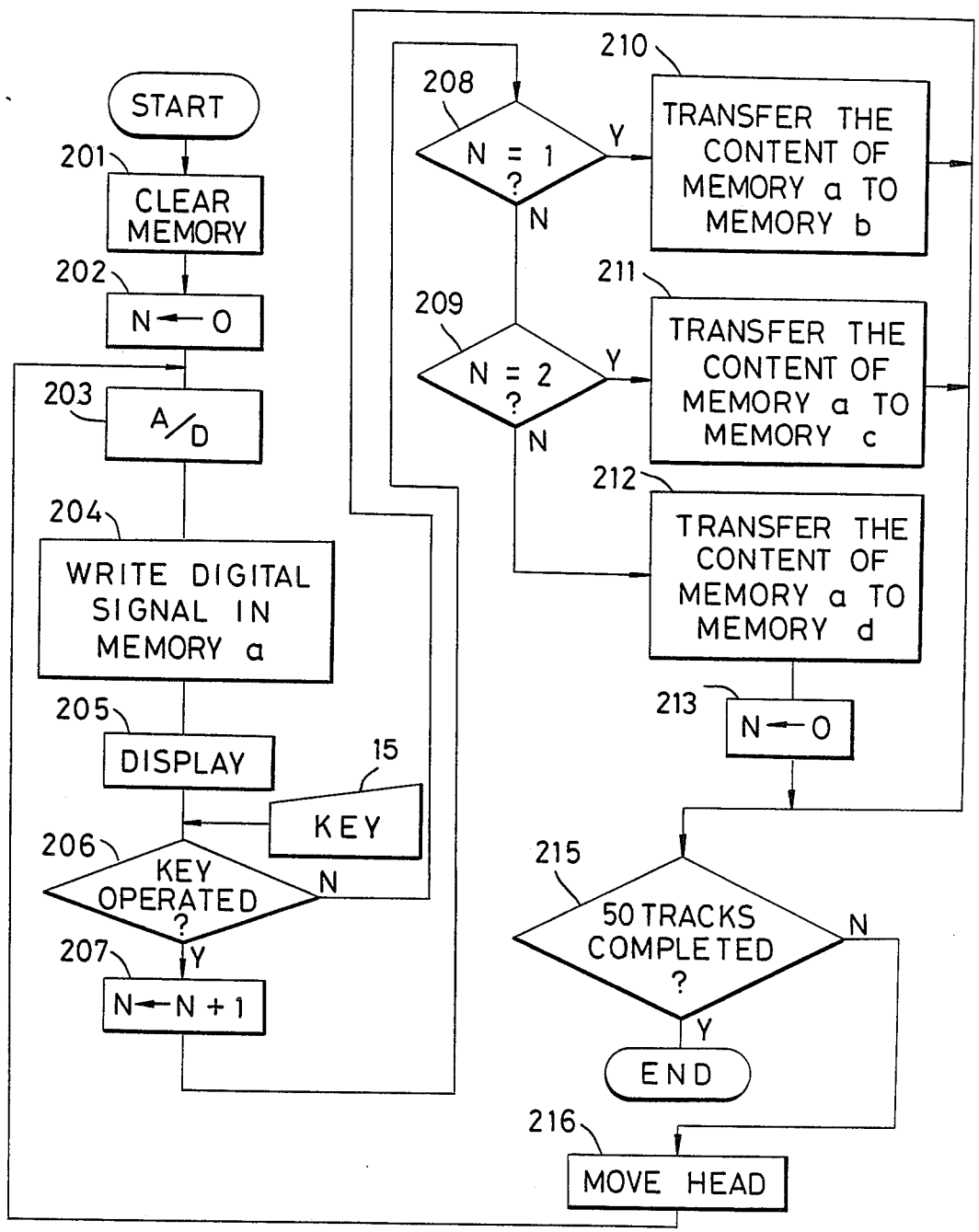
FIG. 5 is a flow chart showing a search function in a special playback mode in a second embodiment.

FIG. 5 is a flow chart showing the function of another embodiment, in which a desired picture can be stored on the monitor in the course of search with the special playback mode.

Referring to FIG. 5, steps 201, 202 and 203 similar to the aforementioned steps 101, 102 and 103 reset the memory and effect the A/D conversion on the video signal regenerated from the track 1, and a step 204 stores the converted signal into the memory area a.

Then, in a step 205, the signal read from the memory a is D/A-converted and displayed on the monitor 8. The storage of the displayed picture is instructed by a key 15. It is assumed that such instruction is not given in this case. Thus a step 206 identifies the absence of actuation of the key 15, and the program therefore proceeds to steps 215 and 216, which respectively correspond to the aforementioned steps 114 and 115. Then a track 2 is regenerated, and the output of the A/D converter 11 is stored in the memory a through the steps 203 and 204. At the same time the digital video signal of the track 1 stored in said memory a is erased.

Then the step 205 displays the video signal of the 2nd track, instead of that of the 1st track, on the area A of the monitor 8. The key 15 is actuated if said displayed picture is to be stored, whereby the control circuit 6 effects a stepwise increment of the content of the internal counter in a step 207. Then a step 208 identifies N=1, and a step 210 transfers the content of the memory a to the memory b. Then the program proceeds through the steps 215 and 216, and the signal of a 3rd track is stored in the memory a in the succeeding steps 203 and 204. Subsequently the step 205 displays the pictures of the 3rd and 2nd tracks respectively in the areas A and B of the monitor 8.

Similarly, in case the video signal of an n-th track is to be stored, the key 15 is actuated and a condition N=2 is reached after the steps 206 and 207. Then the program proceeds through the step 209 to the step 211 whereby the content of the memory a is transferred to the memory c. Then, in case the video signal of an (n+1)-th track is again to be stored, the key 15 is actuated again and a condition N=3 is reached after the steps 206 and 207. Then the program proceeds through the step 209 to the step 212 whereby the content of the memory a is transferred to the memory d, and the internal counter is reset in a step 213. A step 215 is similar to the aforementioned step 114.

Now reference is made to FIG. 6 for explaining an embodiment in which, in the search with the special playback mode, the area A of the monitor 8 always displays the newest picture while the areas B, C and D display preceding pictures in this order.

A step 301 is similar to the aforementioned step 101. A step 302 transfers the contents of the memories a, b and c respectively to the memories b, c and d. A step 303 converts the signal regenerated from a track into a digital signal, which is stored in the memory a in a step 304. In a step 305, the digital signals stored in the memories a, b, c and d are converted into analog signals and displayed on the monitor 8. Steps 306 and 307 respectively correspond to the aforementioned steps 114 and 115.

Playback as in the 2nd embodiment allows the operator to leave the necessary pictures alone, thus enabling comparison thereof. An alarm may be given to the operator when the memories become fully occupied.

In, order to facilitate confirmation of the track number of each picture displayed on the monitor, it is also possible to display the picture number on the monitor by employing a character generator or storing the track number in the storage of the digital signal into the memory.

The above-described process can also be applied to a magnetic disk with frame recording, by storing the signal of either one field into the memory or by increasing the capacity of the memory to the amount of the frame signal.

As explained in detail in the foregoing, the present invention provides, in an electronic still camera system, a playback apparatus allowing the operator to rapidly search the content of a magnetic disk or to store and compare necessary pictures only with a simple circuit structure not involving a high-speed A/D converter or memory of a large capacity.

What is claimed is:

1. A playback apparatus for a medium having plural portions at each of which a video signal is recorded, comprising:
   (a) producing means for regenerating said video signals from said medium one by one and producing corresponding information signals;
   (b) memory means including plural memory parts;
   (c) writing means for writing each of said information signals one by one into a common predetermined one of said plural memory parts;
   (d) generating means for generating a storage signal;
   (e) transfer means responsive to said storage signal for transferring the information signal written in said predetermined memory part to one of the remaining memory parts;
   (f) visual display means for visually displaying images representing the video signals in a predetermined area; and
   (g) transmitting means for transmitting information signals written in said plural memory parts to said visual display means and causing said visual display means to display images representing the transmitted information signals in respectively different portions of said predetermined area.

2. An apparatus according to claim 1, wherein the number of said different portions is equal to the number of said plural memory parts.

3. An apparatus according to claim 2, which further comprises means for detecting that an information signal is written in said one of the remaining memory parts and producing a detection signal, and wherein said transfer means transfers the information signal written in said predetermined memory part to another of the remaining memory parts in response to said detection signal.

4. An apparatus according to claim 1, which further comprises an operating member, and wherein said generating means generates said storage signal in response to operation of said operating member.

5. An apparatus according to claim 4, which further comprises another transmitting means for transmitting one of said video signals regenerated by said producing means to said visual display means and switching means for causing said visual display means to display information signals transmitted by the first-mentioned transmitting means and transmitted by said another transmitting means alternately.

6. An apparatus according to claim 1, wherein said video signals are analog signals, and said producing means comprises converting means for converting said analog signals into digital signals and generating the digital signals as said information signals.

7. An apparatus according to claim 6, wherein said video signals correspond to horizontal scanning lines and said converting means converts regenerated video signals into digital signals once every two or more horizontal scanning lines.

8. A playback apparatus for a medium having plural portions at each of which a corresponding video signal is recorded, comprising:
   (a) producing means for regenerating said video signals from said medium one by one and producing corresponding information signals;
   (b) memory means including plural memory parts having a predetermined order;
   (c) writing means for writing each of said information signals one by one into a first of said plural memory parts;
   (d) transferring means for transferring each information signal written in said first memory part to a last of said memory parts via the remaining memory parts according to said predetermined order;
   (e) visual display means for visually displaying an image representing a video signal in a predetermined area; and
   (f) transmitting means for transmitting information signals writhen in at least a portion of said plural memory parts to said visual display means and causing said visual display means to display images representing the transmitted information signals in respectively different portions of said predetermined area.

9. An apparatus according to claim 8, which further comprises another transmitting means for transmitting one of said video signals regenerated by said producing means to said visual display means and switching means for causing said visual display means to display information signals transmitted by the first-mentioned transmitting means and transmitted by said another transmitting means alternately.

10. An apparatus according to claim 8, wherein said video signals are analog signals, and said producing means comprises converting means for converting said analog signals into digital signals and generating the digital signals as said information signals.

11. An apparatus according to claim 10, wherein said video signals correspond to horizontal scanning lines and said converting means converts regenerated video signals into digital signals once every two or more horizontal scanning lines.

* * * * *